United States Patent
Ge et al.

(10) Patent No.: US 10,740,917 B2
(45) Date of Patent: Aug. 11, 2020

(54) AUTOMATIC CORRECTION METHOD AND DEVICE FOR STRUCTURED-LIGHT 3D DEPTH CAMERA

(71) Applicant: Ningbo YX Information Technology Co., Ltd., Ningbo (CN)

(72) Inventors: Chenyang Ge, Xi'an (CN); Yanmei Xie, Xi'an (CN); Huimin Yao, Xi'an (CN); Bing Zhou, Xi'an (CN); Kangduo Zhang, Xi'an (CN); Long Zuo, Xi'an (CN)

(73) Assignee: XI'AN JIAOTONG UNIVERSITY, Xi'an, Shaanxi (CN)

( * ) Notice: Subject to any disclaimer, the term of this patent is extended or adjusted under 35 U.S.C. 154(b) by 0 days.

(21) Appl. No.: 16/223,574

(22) Filed: Dec. 18, 2018

(65) Prior Publication Data
US 2019/0188873 A1  Jun. 20, 2019

(30) Foreign Application Priority Data

Dec. 18, 2017  (CN) .......................... 2017 1 1367573
Dec. 18, 2017  (CN) .......................... 2017 1 1369838

(51) Int. Cl.
*G06T 7/00* (2017.01)
*G06T 15/00* (2011.01)
(Continued)

(52) U.S. Cl.
CPC ................ *G06T 7/521* (2017.01); *G01C 3/08* (2013.01); *G02B 27/48* (2013.01); *G06K 9/6202* (2013.01);
(Continued)

(58) Field of Classification Search
CPC ..................... G06T 7/521; G06T 7/593; G06T 2207/10048; G06T 2207/10028; G06T 2207/20021; G06T 7/231; G06T 7/74; G06T 7/85; H04N 13/254; H04N 13/271; H04N 13/128; H04N 13/246; G01B 11/272; G01B 11/2504; G01B 11/2545
See application file for complete search history.

(56) References Cited

U.S. PATENT DOCUMENTS 10,194,135 B2 * 1/2019 Ge ........................ H04N 13/204
2014/0002442 A1 * 1/2014 Lamb ..................... G06F 3/1431
345/419

(Continued)

*Primary Examiner* — Alison Slater
(74) *Attorney, Agent, or Firm* — Dragon Sun Law Firm, PC; Jinggao Li, Esq.

(57) ABSTRACT

The present disclosure provides an automatic correction method and device for a structured-light 3D depth camera. When the optical axis of a laser encoded pattern projector and the optical axis of an image reception sensor change, an offset of an input encoded image relative to an image block in a reference encoded image is acquired, and then the position of the reference encoded image is oppositely adjusted upwards or downwards according to an offset change to form a self-feedback regulation closed-loop system between the center of the input encoded image and the center of the reference encoded image, so that the optimal matching relation can always be figured out when the optical axes of the input encoded image and the reference encoded image change drastically. Furthermore, depth calculation can be carried out according to the corrected offset.

6 Claims, 8 Drawing Sheets

(51) Int. Cl.

| | |
|---|---|
| *H04N 13/00* | (2018.01) |
| *G01B 11/27* | (2006.01) |
| *G06T 7/521* | (2017.01) |
| *G06T 7/73* | (2017.01) |
| *G06T 7/55* | (2017.01) |
| *G06K 9/62* | (2006.01) |
| *H04M 1/02* | (2006.01) |
| *G06T 3/20* | (2006.01) |
| *G02B 27/48* | (2006.01) |
| *G01C 3/08* | (2006.01) |
| *G06T 3/60* | (2006.01) |

(52) U.S. Cl.
CPC .............. *G06K 9/6215* (2013.01); *G06T 3/20* (2013.01); *G06T 3/60* (2013.01); *G06T 7/55* (2017.01); *G06T 7/74* (2017.01); *H04M 1/0202* (2013.01); *G06T 2207/10028* (2013.01)

(56) References Cited

U.S. PATENT DOCUMENTS

| | | | |
|---|---|---|---|
| 2014/0146136 A1* | 5/2014 | Ge | G01C 3/32 |
| | | | 348/43 |
| 2015/0228080 A1* | 8/2015 | Ge | G06K 9/2036 |
| | | | 382/154 |
| 2015/0229911 A1* | 8/2015 | Ge | G06T 7/521 |
| | | | 348/47 |
| 2018/0249142 A1* | 8/2018 | Hicks | H04N 17/002 |

* cited by examiner

AUTOMATIC CORRECTION METHOD AND DEVICE FOR STRUCTURED-LIGHT 3D DEPTH CAMERA

CROSS-REFERENCE TO RELATED APPLICATIONS

This Application claims priority from CN Application No. 201711369838.8, filed Dec. 18, 2017 and CN Application No. 201711367573.8, filed Dec. 18, 2017, the contents of which are incorporated herein in the entirety by reference.

Some references, which may include patents, patent applications, and various publications, are cited and discussed in the description of the present disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

TECHNICAL FIELD

The present disclosure belongs to the technical fields of image processing, computer vision and artificial intelligence, and particularly relates to an automatic correction method and device for a structured-light 3D depth camera.

BACKGROUND

Recently, convenient and efficient three-dimensional reconstruction of scenes or objects has become a research focus, more and more three-dimensional imaging techniques are constantly emerging, and for the sake of realistic three-dimensional images, it is necessary to calculate the depth information of scenes or objects, which means that depth perception is required. As the core technology of three-dimensional reconstruction, the depth perception technology has broad application and development prospects in the fields such as machine vision, man-machine interaction, 3D printing, virtual reality, smart phones and the like.

The existing depth perception technology based on structured-light encoding and decoding can acquire accurate depth information without being affected by ambient light, algorithms or hardware and can be easily, conveniently and rapidly implemented in such a manner that a constant image is projected to the surface of an object with infrared lasers and is reflected by the surface of the object to form speckles and these speckles are acquired by an image sensor and then calculated by an image depth perception chip to obtain the depth information of the object. 3D depth cameras based on the structured-light encoding and decoding technology have a simple three-dimensional matching process and a small amount of calculation; however, in order to obtain high-precision depth information, high assembly precision of the 3D depth cameras should be ensured, and once the optical axis of a laser image projector or an image sensor deflects in use due to falling or collision, the depth precision will decrease, and the mismatch noise will increase. Particularly for structured-light 3D depth cameras embedded in smart phones, falling, collision and knocking can hardly be avoided when the smart phones are used by users, which is quite likely to result in distortion of the optical axes of the structured-light depth cameras. For this reason, it is of particular importance to develop an automatic collection technique for the structured-light 3D depth cameras to avoid precision reduction and noise increase caused by optical axis changes and to improve the robustness of the structured-light 3D depth cameras.

SUMMARY

In view of this, the present disclosure provides an automatic correction method and device for a structured-light 3D depth camera. According to the automatic correction method and device for the structured-light 3D depth camera, when the optical axis of a laser encoded pattern projector and the optical axis of an image reception sensor change, an offset of an input encoded image relative to an image block in a reference encoded image is acquired, and then the position of the reference encoded image is oppositely adjusted upwards or downwards according to an offset change to form a self-feedback regulation closed-loop system between the center of the input encoded image and the center of the reference encoded image, so that the optimal matching relation can always be figured out when the optical axes of the input encoded image and the reference encoded image change drastically. Furthermore, depth calculation can be carried out according to the corrected offset.

On one hand, the present disclosure provides an automatic correction method for a structured-light 3D depth camera. The method comprises the following steps:
S100, acquiring a first feature block from a reference encoded image;
wherein, the reference encoded image has a known depth distance;
S200, searching for a first matching block corresponding to the first feature block from an input encoded image;
S300, acquiring a first offset of the first feature block relative to the first matching block according to optical axis positions of a laser encoded pattern projector and an image reception sensor;
S400, correcting a position of the reference encoded image according to the first offset; and
S500, acquiring a first feature block from the corrected reference encoded image if the first offset is not zero, and returning to S200.

The method further comprises the following steps:
S600, acquiring one pixel of the input encoded image, and taking the pixel as a first pixel;
acquiring a second feature block with the first pixel as a center;
S700, searching for a second matching block matched with the second feature block from the corrected reference encoded image;
S800, acquiring a second offset of the second feature block relative to the second matching block, and calculating a depth distance corresponding to the first pixel according to the second offset; and
S900, returning to S600 till depth distances corresponding to all pixels of the input encoded image are acquired;

According to the method, searching in S200 and S700 comprises the following steps:
determining a center and size of a matching search window, wherein the center of the matching search window is a center point of the feature block, and the size of the matching search window is greater than the size of the feature block; and
extracting candidate matching blocks from the matching search window, calculating similarities of the candidate matching blocks to the feature block, and taking the candidate matching block with the maximum similarity as the matching block corresponding to the feature block.

According to the method, acquisition in S300 comprises the following steps:

S301, acquiring center point coordinates of each feature block and the matching block corresponding to each feature block, and calculating differences between corresponding coordinate components of the center point coordinates; and S302, acquiring an average of the differences between all the coordinate components and taking the average as the first offset.

According to the method, correction in S300 comprises the following steps:

S311, if the optical axes of the laser encoded pattern projector and the image reception sensor are parallel to a first component of the first offset, moving in a direction opposite to a second component of the first offset by a distance equal to the absolute value of the second component of the first offset;

S312, if the optical axes of the laser encoded pattern projector and the image reception sensor are parallel to the second component of the first offset, moving in a direction opposite to the first component of the first offset by a distance equal to the absolute value of the first component;

wherein, the components of the first offset are two-dimensional vectors.

On the other hand, the present disclosure provides an automatic correction device for a structured-light 3D depth camera. The device comprises:

a first acquisition module configured to acquire a first feature block from a reference encoded image, wherein the reference encoded image has a known depth distance;

a first search module configured to search for a first matching block corresponding to the first feature block from an input encoded image;

a first offset acquisition module configured to acquire a first offset of the first feature block relative to the first matching block according to optical axis positions of a laser encoded pattern projector and an image reception image;

a correction module configured to correct a position of the reference encoded image according to the first offset; and a first return module configured to acquire a first feature block from the corrected reference encoded image if the first offset is not zero and to return to the first search module.

The device further comprises:

a second acquisition module configured to acquire one pixel of the input encoded image, to take the pixel as a first pixel and to acquire a second feature block with the first pixel as a center;

a second search module configured to search for a second matching block matched with the second feature block from the corrected reference encoded image;

a calculation module configured to acquire a second offset of the second feature block relative to the second matching block and to calculate a depth distance corresponding to the first pixel according to the second offset; and a second return module configured to return to the second acquisition module till depth distances corresponding to all pixels of the input encoded image are acquired.

According to the device, the first search module and the second search module carry out searching through the following steps:

determining a center and size of a matching search window, wherein the center of the matching search window is a center point of the feature block, and the size of the matching search window is greater than the size of the feature block; and extracting candidate matching blocks from the matching search window, calculating similarities of the candidate matching blocks to the feature block, and taking the candidate matching block with the maximum similarity as the matching block corresponding to the feature block.

According to the device, the first offset acquisition module acquires the first offset through the following steps:

acquiring center point coordinates of each feature block and the matching block corresponding to each feature block, and calculating differences between corresponding coordinate components of the center point coordinates; and acquiring an average of the differences between all the coordinate components and taking the average as the first offset.

According to the device, the first offset acquisition module carries out correction through the following steps:

if the optical axes of the laser encoded pattern projector and the image reception sensor are parallel to a first component of the first offset, moving in a direction opposite to a second component of the first offset by a distance equal to the absolute value of the second component of the first offset;

if the optical axes of the laser encoded pattern projector and the image reception sensor are parallel to the second component of the first offset, moving in a direction opposite to the first component of the first offset by a distance equal to the absolute value of the first component.

wherein, the components of the first offset are two-dimensional vectors.

Compared with the prior art, the method and device of the present disclosure solve the problems of depth precision reduction and mismatch noise increase caused by changes to optical axes of the laser encoded pattern projector and the image reception sensor, realize real-time automatic correction of the structured-light depth camera and improve the robustness of the depth camera.

DETAILED DESCRIPTION

A self-correction method and device in the invention are further illustrated in detail below in combination with drawings 1-8.

Figure 1:
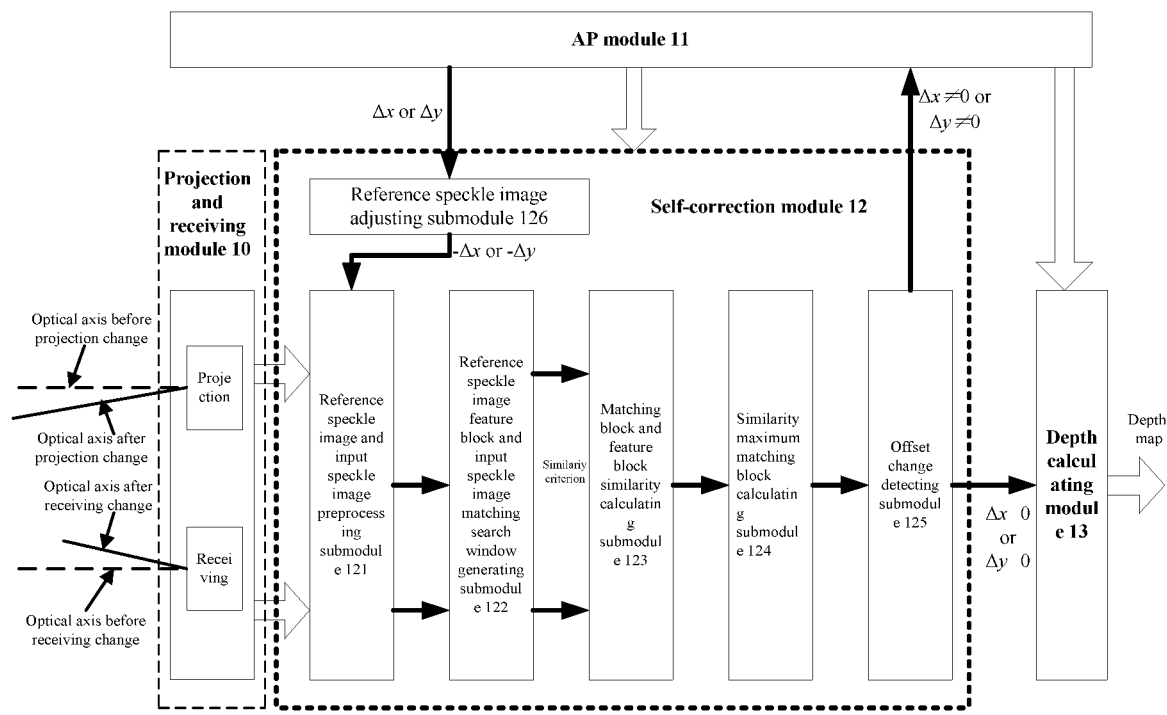
FIG. 1 is a structure block diagram of a self-correction device for a structured light depth camera of a smart phone in an embodiment.

FIG. 1 is a structure block diagram of a self-correction device for a structured light depth camera of a smart phone of an embodiment of the invention. As shown in FIG. 1, the self-correction device comprises a projection and receiving module 10, an AP module 11, a self-correction module 12 and a depth calculating module 13.

The projection and receiving module 10 is used for receiving an input speckle image which is projected from an infrared laser speckle projector, acquired by an image receiving sensor and used for depth calculation, and a reference speckle image.

The infrared laser speckle projector projects a speckle image, may consist of a vertical cavity surface emitting laser (VCSEL), a collimating mirror and a diffractive optical element (DOE), may also consist of a semiconductor laser device (LD), a collimating mirror and a diffractive optical element (DOE), may further consist of a digital light procession (DLP) projector, an LD/VCSEL and a micro-electro-mechanical systems (MEMS) device and the like, and projected speckle patterns comprise a random speckle, rule symbol array structured light, a mixed structured light speckle including a random speckle and rule symbols, and the like.

The input speckle image is an input speckle image sequence which is acquired by the infrared laser speckle projector and the image receiving sensor, and the reference speckle image is a speckle image which is cured in an internal or external memory and has known depth distance information.

The AP module 11 is used for controlling parameters and processes such as the number and size of feature blocks extracted from the reference speckle image, the range and size of a matching search window in the input speckle image and the size of matching blocks extracted from the matching search window in a matching process, and meanwhile, the optimal offset of the change of the optical axes of the reference speckle image and the input speckle image can be calculated in a manual or automatic mode to adjust and correct the reference speckle image.

By the self-correction module 12, the change of the optical axes of the reference speckle image and the input speckle image are detected, the offset of the reference speckle image relative to the input speckle image is calculated through the feature block of the reference speckle image and the matching block of the input speckle image, the reference speckle image is corrected according to the optimal offset, thus, the center of the input speckle image and the center of the reference speckle image form a self-feedback adjusting closed-loop system, an optimal matching relation between the input speckle image and the corrected reference speckle image can always be found out when the optical axes vary widely, and a correct offset is obtained and is used for depth calculation.

The self-correction module 12 further comprises a reference speckle image and input speckle image preprocessing submodule 121, a reference speckle image feature block and input speckle image matching search window generating submodule 122, a match block and feature block similarity calculating submodule 123, an offset (similarity maximum matching block) calculating submodule 124, an offset change detecting submodule 125 and a reference speckle image adjusting submodule 126.

The reference speckle image and input speckle image preprocessing submodule 121 is used for carrying out adaptive preprocessing including RAW data format conversion, adaptive denoising, coherence enhancing, binarization and the like on the reference speckle image and the input speckle image, and aims to enable a laser speckle image to be clear and reduce noise interference through preprocessing on the laser speckle image, and self-correction and depth sensing and calculation of contents in the invention are facilitated.

The reference speckle image feature block and input speckle image matching search window generating submodule 122 is used for extracting an image block of which the size is m×n from the position of a point (x, y) in the reference speckle image as a feature block, a matching search window is an input speckle image block which takes the corresponding point, of which the position is the same as that of the center point y) of the feature block as the center point, in the input speckle image and is extracted in a certain range around the center point, the size is M×N, M and N are integers, and generally, M>m and N>n, wherein m×n is the size of the feature block in the reference speckle image, m is the width of the feature block, and n is the height of the feature block; and M×N is the size of the matching search window in the input speckle image, M is the width of the search window, and N is the height of the search window.

The matching block and feature block similarity calculating submodule 123 is used for extracting an image block of which the size is the same as that of the feature block from the matching search window as a matching block, calculating the similarity between the feature block and the matching block according to a normalized cross correlation method (NCC) similarity criterion or sum-of-absolute-values-of-differences (SAD), and simultaneously obtaining similarities between the feature block and all matching blocks through parallel calculation.

The similarity maximum matching block calculating submodule 124 is used for solving a maximum value of all similarities which are obtained by carrying out matching calculation on the same feature block through the matching block and feature block similarity calculating submodule 123, the matching block corresponding to the maximum value is the optimal matching block of the feature block, an offset $(\Delta x, \Delta y)$ is calculated according to the center point (x, y) of the feature block and coordinates (x', y') of the center point of the optimal matching block in the input speckle image, namely the offset vector of the feature block is calculated, and the offset is obtained by subtracting a coordinate value of the center point (x', y') of the optimal matching block from a coordinate value (x, y) of the center point of the feature block according to an X-axis and a Y-axis separately.

The offset change detecting submodule 125 is used for determining the change direction and size of the reference speckle image relative to the input speckle image according to the offset, namely the directions and sizes of the change of the optical axes of the infrared laser speckle projector and the image receiving sensor are determined. If the infrared laser speckle projector and the image receiving sensor of the projection and receiving module 10 are horizontally placed in the left-right direction before the optical axes change, namely the optical axes of the infrared laser speckle projector and the image receiving sensor are parallel in the horizontal direction, deviation in the direction which is perpendicular to the Y-axis is mainly adjusted after the optical axes change, if $\Delta y \neq 0$, $\Delta y$ is output to the AP module 11, the AP module 11 calculates an optimal offset, the reference speckle image is adjusted reversely according to $\Delta y$, if $\Delta y=0$, it shows that the optical axes do not change, and along with increasing of the offset, the change of the optical axes of the infrared laser speckle projector and the image receiving sensor is increased. On the contrary, if the infrared laser speckle projector and the image receiving sensor of the projection and receiving module 10 are vertically placed before optical axes change, namely the optical axes of the infrared laser speckle projector and the image receiving sensor are parallel in the vertical direction, deviation in the horizontal X-axis direction is mainly adjusted after the optical axes change. Subsequently, the horizontal placement of the infrared laser speckle projector and the image receiving sensor is mainly taken as an example.

The reference speckle image adjusting submodule 126 is used for reversely adjusting the reference speckle image according to the offset. If the infrared laser speckle projector and the image receiving sensor are placed horizontally, the reference speckle image is reversely adjusted according to an offset $\Delta y$. If $\Delta y>0$, it shows that the optical axis of the reference speckle image moves downwards relative to the input speckle image, and the reference speckle image is integrally adjusted upwards, if $\Delta y<0$, it shows that the optical axis of the reference speckle image moves upwards relative to the input speckle image, and the reference speckle image is integrally adjusted downwards. Similarly, if the infrared laser speckle projector and the image receiving sensor are placed vertically, the reference speckle image is reversely adjusted according to an offset $\Delta x$.

The depth calculating module 13 calculates a depth value corresponding to a pixel point in the input speckle image, an image block is extracted from the input speckle image, a point which corresponds to the center point of an input image block is found from the adjusted reference speckle image, a matching search window is extracted around the point in a certain range by taking the point as the center, sum-of-absolute-values-of-differences SAD or normalized cross correlation method (NCC) similarity between the input image block and the matching block in the matching search window is calculated, a matching block which corresponds to a minimum SAD value or a minimum NCC similarity value is solved as a corrected optimal matching block, the position of the center point of the matching block relative to the center point of the matching search window is the offset of the input image block, the depth information of the current center point of the input image block is calculated according to the depth calculating formula in combination with the known distance parameter of the reference speckle image and the baseline distance between the infrared laser speckle projector and the image receiving sensor, and a depth map corresponding to the whole input speckle image is obtained after point-by-point and line-by-line calculation is carried out.

The size of the image block extracted from the input speckle image in a depth calculating process and the size of the feature block extracted from the reference speckle image feature block and matching search window generating submodule in a self-correction process can be the same, and can also be different.

The device has the following basic functions: the input speckle image sequence (with unknown depth information) from the infrared laser speckle projector and the image receiving sensor is compared with the reference speckle image (which is a standard speckle image as a matching reference, and has a fixed pattern and known depth distance information) by image adaptive preprocessing, a speckle feature block is extracted from the reference speckle image, block matching motion estimation is carried out on the speckle feature block and a matching block of which the size is the same as that of the feature block in an input matching search window, a matching block which is the most similar to the feature block is found by a certain search strategy and a similarity criterion to obtain the offset of coordinates of the matching block in the input speckle image and coordinates of the center point of the feature block, the reference speckle image is reversely adjusted according to the offset, the adjusted reference speckle image and the input speckle image are subjected to block matching motion estimation to obtain the offset of every point in the input speckle image relative to the reference speckle image, the depth information of the current center point is obtained according to the offset, the known distance parameter of the reference speckle image and the baseline distance between the infrared laser speckle projector and the image receiving sensor and on the basis of the depth calculating formula, and the depth information corresponding to the whole input speckle image is obtained after point-by-point and line-by-line calculation is carried out. Functions of various submodules of the device will be illustrated in more detail in introduction of the flow of the method hereinafter.

Figure 2:
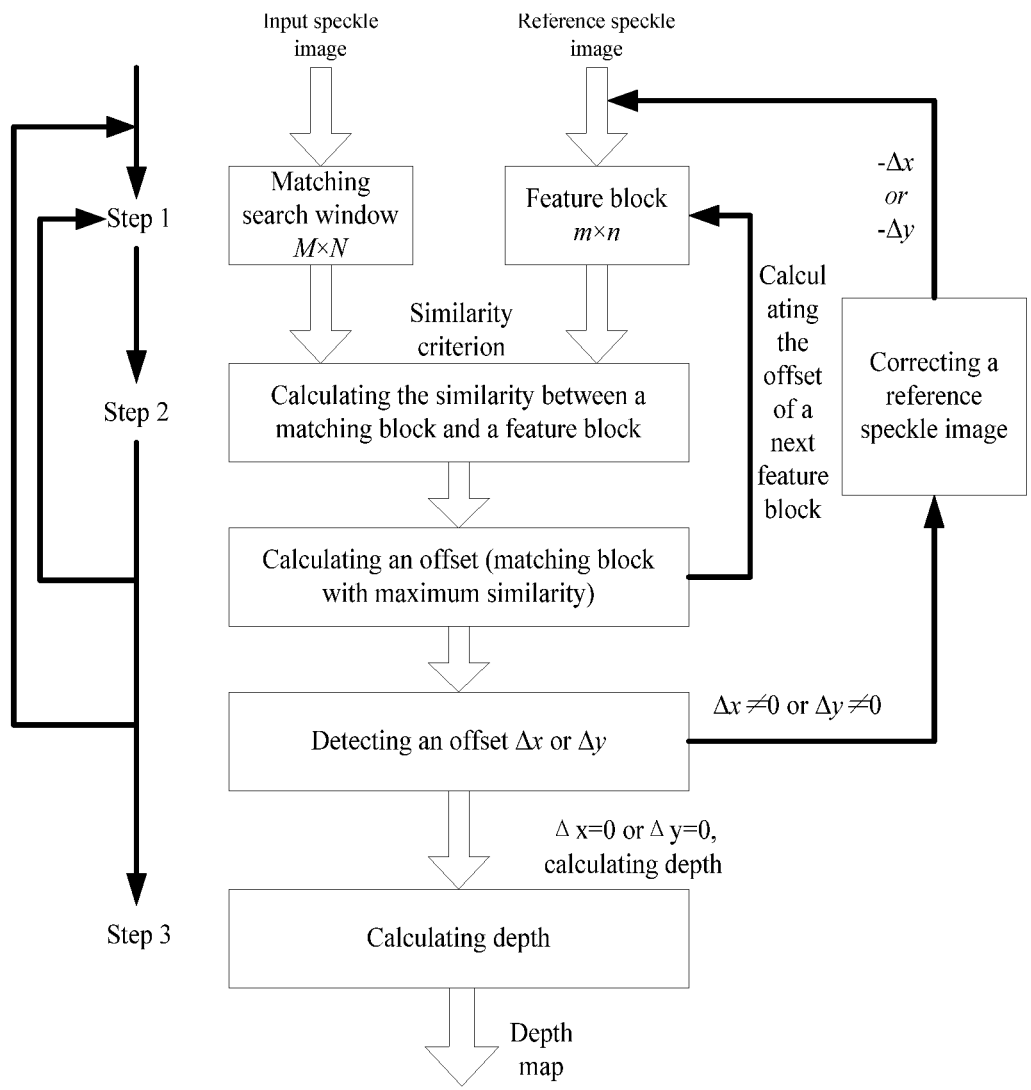
FIG. 2 is a flow chart of a self-correction method for a structured light depth camera of a smart phone in an embodiment.

FIG. 2 is an integral flow chart of the self-correction method for the structured light depth camera of the smart phone of the embodiment of the invention. In order to clearly illustrate the self-correction method provided by the invention, the method will be described below in combination with FIG. 2-FIG. 7, and particularly, the method comprises the following steps:

step 1: projecting a speckle image by an infrared laser speckle projector, and receiving the projected speckle image and generating an input speckle image and a reference speckle image by an image receiving sensor.

Particularly, the infrared laser speckle projector projects a laser beam in a fixed graph to a plane which is distant from the infrared laser speckle projector by a distance of d, the plane is perpendicular to the center axis of the projector, and a matching reference graph which is acquired by the image receiving sensor, adaptively preprocessed and stored, and is used for carrying out depth sensing and calculation on the input speckle image sequence is the reference speckle image.

Figure 3:
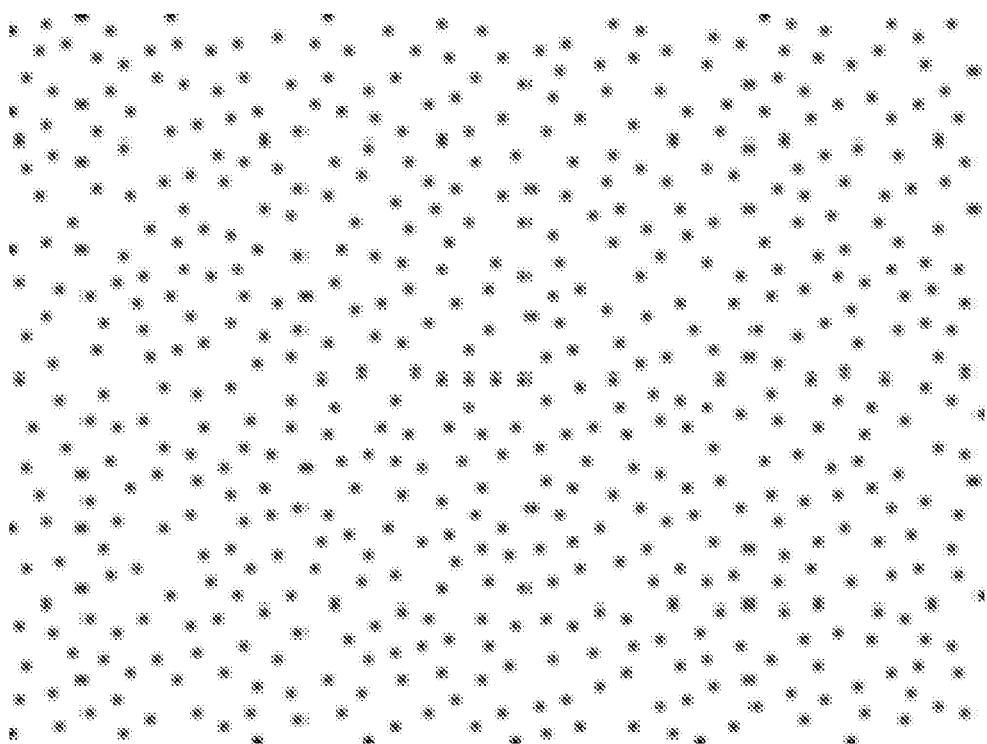
FIG. 3 is a schematic diagram of a laser speckle pattern in an embodiment.

A speckle image is formed by projecting a laser beam to a target object or a projection space by the infrared laser speckle projector, and then is acquired by the image receiving sensor to obtain the input speckle image. The input speckle image is subjected to adaptive preprocessing like the reference speckle image. FIG. 3 shows a laser speckle pattern projected by the infrared laser speckle projector, and the laser speckle pattern consists of random speckle points. FIG. 3 shows a laser speckle pattern which is only taken as an example, and the contents of the invention are suitable for various structured light speckle patterns including a random speckle, rule symbol array structured light, a mixed structured light speckle comprising a random speckle and rule symbols and the like.

Step 2: detecting the change of the optical axis of the reference speckle image relative to the input speckle image, and correcting the reference speckle image according to the optimal offset.

In a specific embodiment, step 2 further comprises:

step 2.1: preprocessing the reference speckle image and the input speckle image, setting feature blocks in the reference speckle image, wherein the center point of the feature blocks is $(x_{i=1,\ldots,p}, y_{i=1,\ldots,p})$, and the sizes of the feature blocks are m×n, and extracting a matching search window which takes a point corresponding to the position of $(x_{i=1,\ldots,p}, y_{i=1,\ldots,p})$ as the center and has the size being M×N (wherein M>m, N>n) from the input speckle image; wherein preprocessing on the reference speckle image and the input speckle image comprises adaptive preprocessing including RAW data format conversion, adaptive denoising, coherence enhancing, binarization and the like.

Step 2.2: extracting a matching block with the size being m×n from the matching search window, and calculating the similarity between the matching block and the feature block through a similarity criterion, wherein the matching block corresponding to the maximum similarity is the optimal matching block;

particularly, as shown in FIG. 2, extracting a matching block $A_{rel}$ of which the size is m×n and is the same as the size of the feature block from the matching search window, and calculating the similarity between the feature block $A_{ref}$ and the matching block $A_{rel}$ according to a normalized cross correlation method (NCC) similarity criterion formula:

$$sim = \frac{(n_0 c - ab)}{\sqrt{a(n_0 - a)b(n_0 - b)}}$$

or calculating the similarity between the feature block $A_{ref}$ and the matching block $A_{rel}$ according to a sum-of-absolute-values-of-differences (SAD) formula:

$$sim\_sad = \sum_{i=1}^{m} \sum_{j=1}^{n} |x_{i,j} - y_{i,j}|$$

wherein $n_0$ is the number of pixel points of the matching block (or the number of pixel points of the feature block, namely m×n), $$a = \sum_{i=1}^{m} \sum_{j=1}^{n} x_{i,j}^2,$$

$$b = \sum_{i=1}^{m} \sum_{j=1}^{n} y_{i,j}^2,$$

$$c = \sum_{i=1}^{m} \sum_{j=1}^{n} x_{i,j} y_{i,j},$$

Figure 4:
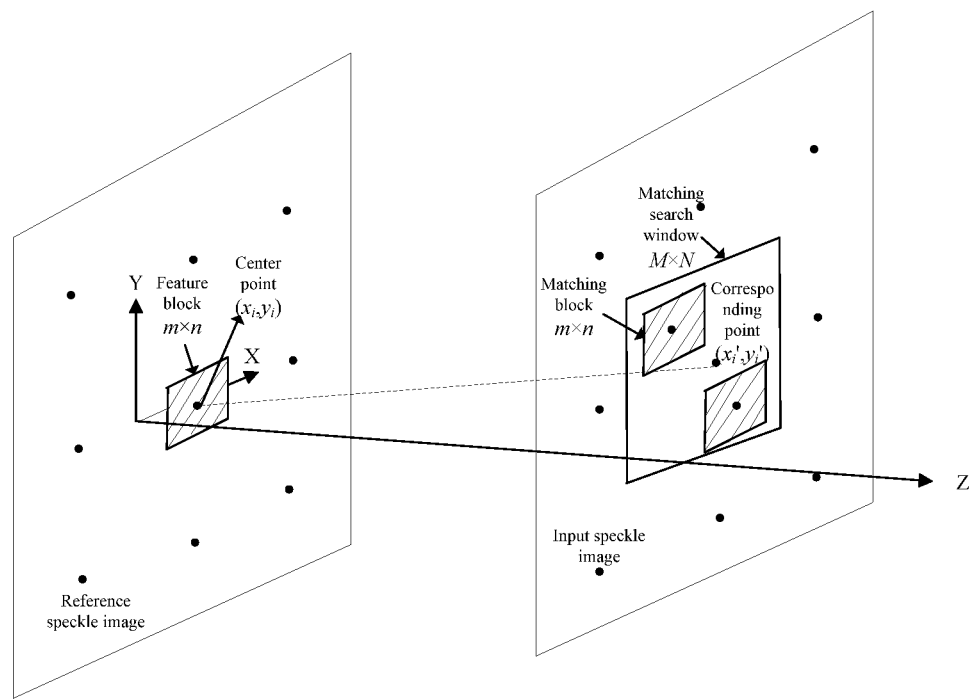
FIG. 4 is a schematic diagram of a feature block of a reference speckle image and a matching search window in an embodiment.

$x_{i,j}$ shows values of the pixel points in the feature block, and $y_{i,j}$ shows the values of the pixel points in the matching block. As shown in FIG. 4, for every matching block $A_{rel}$ in the matching search window, the similarity between the matching block $A_{rel}$ and the feature block $A_{ref}$ is calculated, the maximum value $max(sim_{M \times N})$ or $max(sim'_{M \times N})$ of all similarity values in the matching search window is solved, and the matching block corresponding to the maximum similarity is the optimal matching block.

Figure 5:
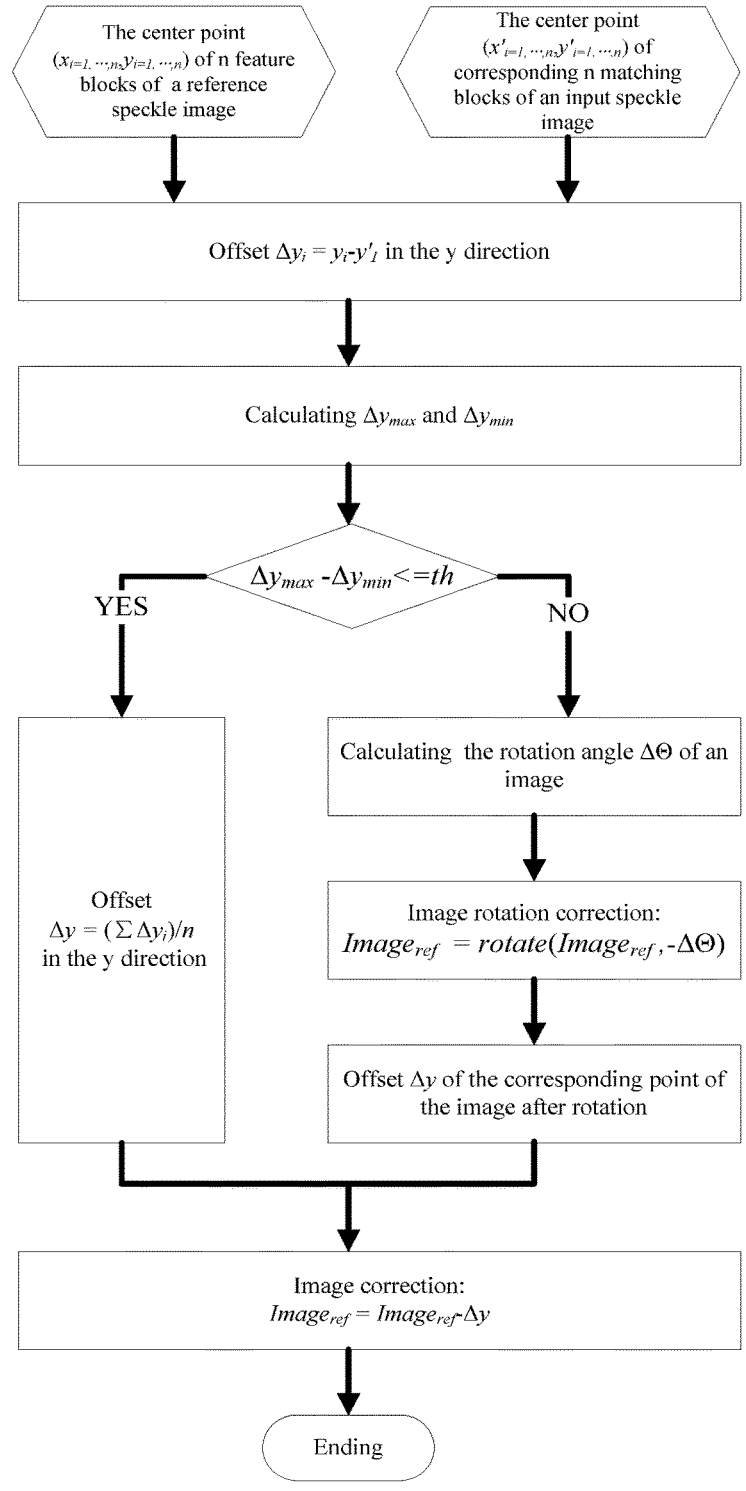
FIG. 5 is a flow chart of a self-correction process in an embodiment.

Step 2.3: extracting the center point $(x'_{i=1, \ldots, p}, y'_{i=1, \ldots, p})$ of the optimal matching block, and calculating the offset $(\Delta x_{i=1, \ldots, p}, \Delta y_{i=1, \ldots, p})$ between the center point $(x_{i=1, \ldots, p}, y_{i=1, \ldots, p})$ of the feature block and the center point $(x'_{i=1, \ldots, p}, y'_{i=1, \ldots, p})$ of the matching block;

for example, the infrared laser speckle projector and the image receiving sensor are horizontally placed in the left-right direction before optical axes change, namely, the optical axes of the infrared laser speckle projector and the image receiving sensor are parallel in the horizontal direction, and after the optical axes change, deviation in the direction which is perpendicular to a Y-axis is mainly adjusted. As shown in FIG. 5, after corresponding points are found out, the offset $\Delta y_i$ in the direction y and the offset $\Delta x_i$ in the direction x of every corresponding point of the reference speckle image and the input speckle image are calculated according to the formula below.

$$\Delta y_i = y_i - y'_i$$

$$\Delta x_i = x_i - x'_i$$

Step 2.4: detecting the offset, outputting the offset $(\Delta x_i, \Delta y_i)$ to the mobile phone AP terminal and solving the optimal offset according to a certain rule; and particularly, as shown in FIG. 5, calculating the maximum value $\Delta y_{max}$ and the minimum value $\Delta y_{min}$, which correspond to the center point of the matching block of the input speckle image, of the center point of the feature block of the reference speckle image.

Figure 6:
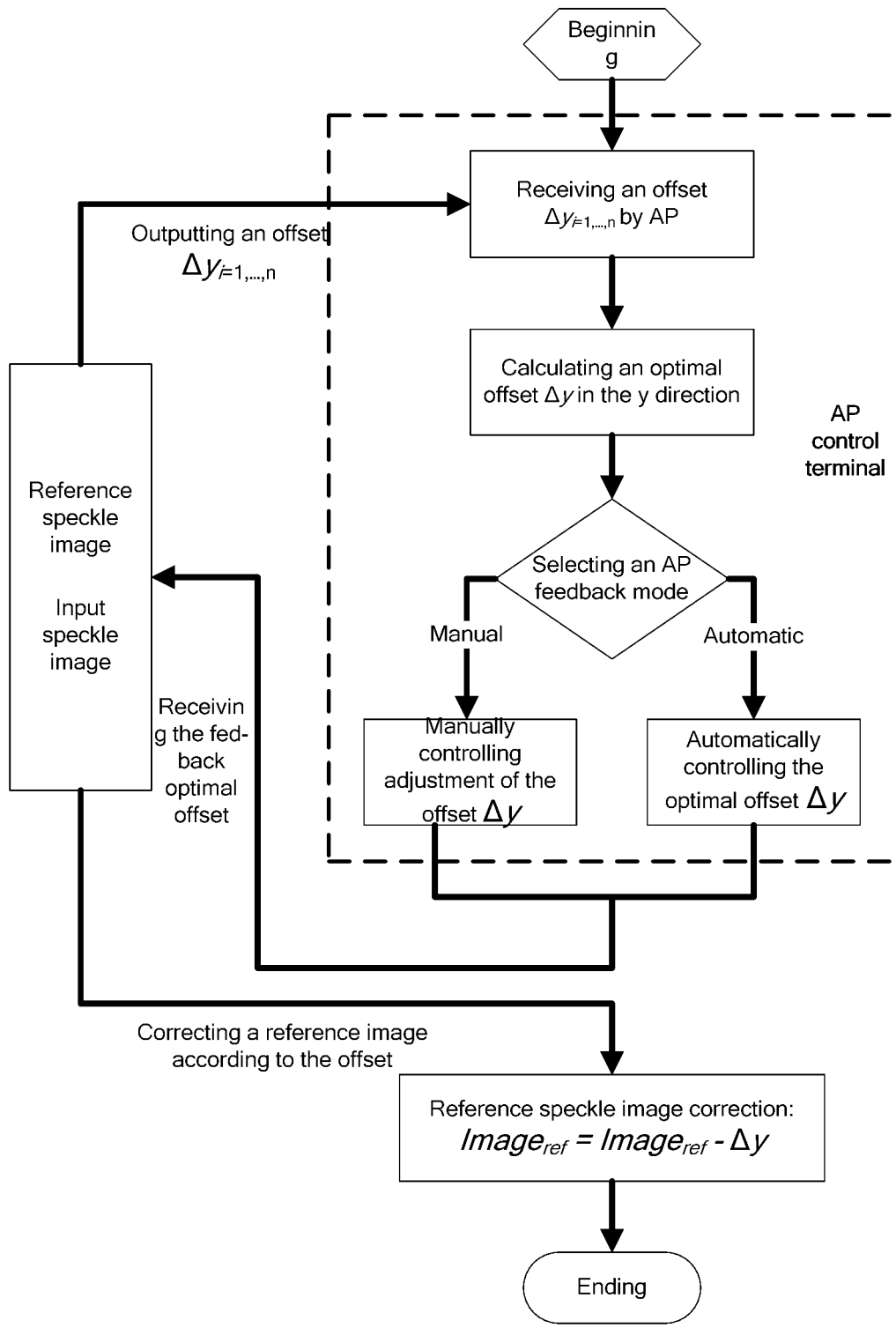
FIG. 6 is a flow chart of an AP manual control process in an embodiment.

Then the optimal offset used for image correction is calculated according to FIG. 5. A threshold value th is set, if a judgment condition $\Delta y_{max} - \Delta y_{min} <= th$ is met, the mean value of $\Delta y_i$ is taken as the optimal offset for the image correction:

$$\Delta y = \frac{1}{p} \sum_{i=1}^{p} \Delta y_i$$

or as shown in FIG. 6, $\Delta y$ is adjusted under manual control at the AP terminal to enable the effect of the depth map to be optimal.

If the judgment condition $\Delta y_{max} - \Delta y_{min} <= th$ is not met, the rotation angle θ of an image needs to be calculated through a point $(x_{i=1, \ldots, p}, y_{i=1, \ldots, p})$ and a point $(x'_{i=1, \ldots, p}, y'_{i=1, \ldots, p})$ to rotatably correct the reference speckle image.

Figure 7:
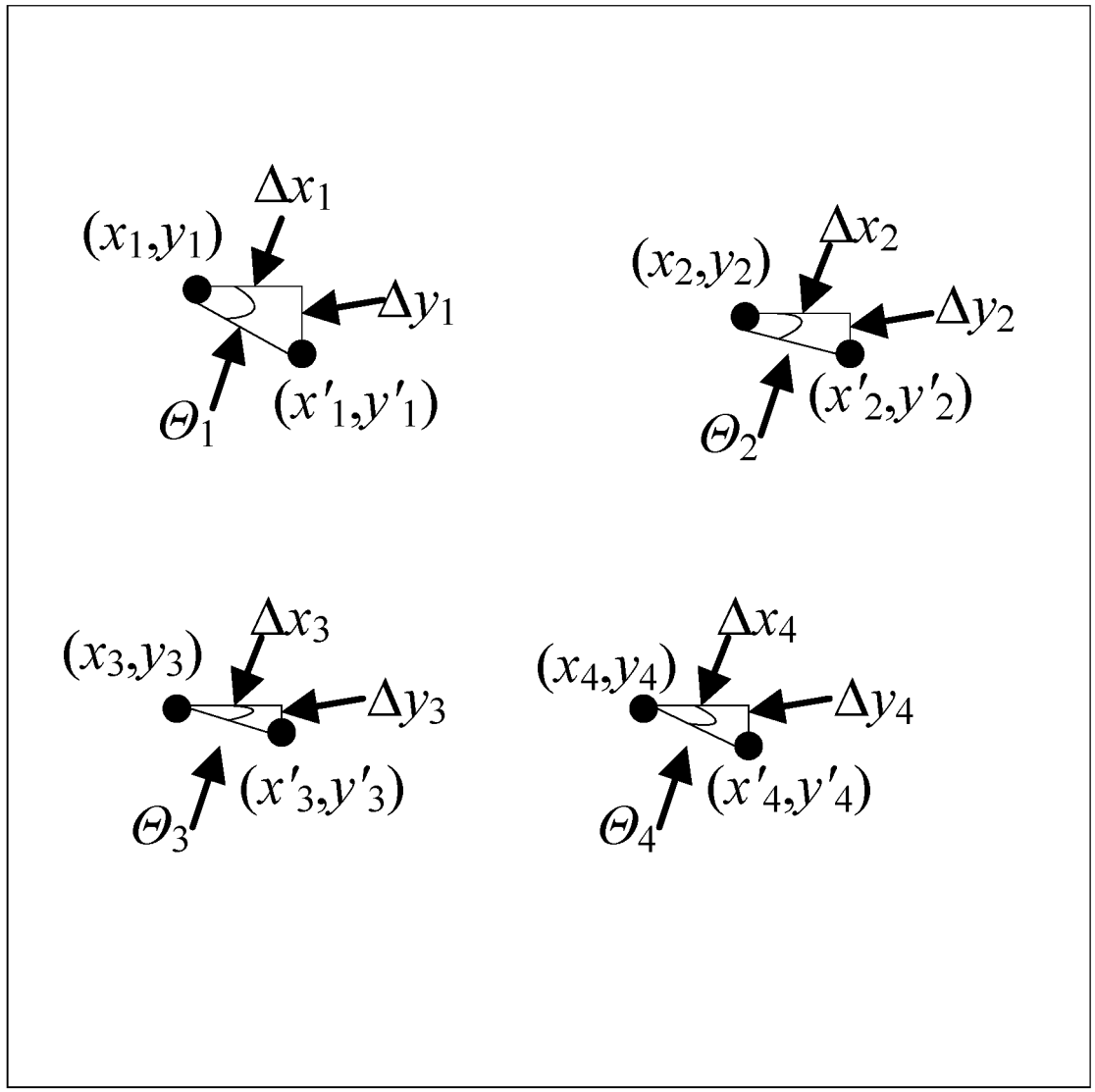
FIG. 7 is a schematic diagram of a method for solving the rotation angle of an image in an embodiment.

As shown in FIG. 7, for a point $(x_i, y_i)$ and a point $(x'_i, y'_i)$, an included angle $\theta_i$ between the two points is solved and is as follows:

$$\tan \theta_i = \frac{y_i - y'_i}{x_i - x'_i}$$

namely $$\theta_i = \arctan \frac{y_i - y'_i}{x_i - x'_i}.$$

The reference speckle image is subjected to reverse rotational processing by the mean value $$\Delta \theta = \frac{1}{p} \sum_{i=1}^{p} \theta_i$$

of all angles:

$Image_{ref} = rotate(Image_{ref}, -\Delta \theta)$, or as shown in FIG. 6, $\Delta \theta$ is adjusted under manual control at the AP terminal to enable the effect of the depth map to be optimal.

Step 2.5: integrally adjusting the position of the reference speckle image in the up-down direction $(-\Delta y)$ or the left-right direction $(-\Delta x)$ reversely according to the optimal offset;

If $\Delta y \neq 0$, the reference speckle image is reversely corrected according to the offset $\Delta y$, namely:

$$Image_{ref} = Image_{ref} - \Delta y,$$

and if $\Delta y = 0$, the reference speckle image is not corrected.

Step 3, searching the optimal matching block of every pixel point of the input speckle image in the reference speckle image in an image block mode to obtain an offset (Δx',Δy'), and calculating the depth information of the pixel point by use of the offset according to the depth calculating formula.

Particularly, the image block is extracted from the input speckle image, the matching search window which has a certain range is extracted from the corrected reference speckle image, the matching block of which the size is the same as that of the input image block is extracted from the matching search window, SAD values or NCC similarity of the input image block and the matching block is calculated, the matching block corresponding to the minimum SAD value or NCC similarity value is the optimal matching block, and the offset of the center point of the optimal matching block relative to the position of the center point of the matching search window is the offset (Δx',Δy') of the input image block.

An offset Δm (Δm=Δx', or Δm=Δy') in the x direction or the y direction is selected, and in combination with the known distance d of the reference speckle image, the focal length f of the image receiving sensor, the baseline distance s between the infrared laser speckle projector and the image receiving sensor and the pixel pitch parameter μ of the pixel points of the image receiving sensor, the depth information d of the center point (x, y) of the input image block is calculated according to the following formula:

$$d' = \frac{fsd}{fs + \Delta m \mu d}$$

wherein the optimal offset Δm is equal to the difference between the coordinate value of the center point x of the matching search window and the coordinate value of the center point x' of the optimal matching block, or the difference between the coordinate value of the center point y of the matching search window and the coordinate value of the center point y' of the optimal matching block, and Δm can be positive or negative.

Preferably, if the optical axes of the infrared laser speckle projector and the image receiving sensor are parallel in the horizontal direction, then only the offset Δy of the feature block and the optimal matching block in the Y-axis direction can be concerned, and the center of the optical axis of the input speckle image and the center of the optical axis of the corrected reference speckle image are kept parallel in the horizontal direction by reversely adjusting the offset −Δy of the reference speckle image. Similarly, if the optical axes of the infrared laser speckle projector and the image receiving sensor are parallel in the vertical direction, then only the offset Δx of the feature block and the optimal matching block in the X-axis direction can be concerned, and the center of the optical axis of the input speckle image and the center of the optical axis of the corrected reference speckle image are kept parallel in the vertical direction by reversely adjusting the offset −Δx of the reference speckle image.

As an example, a search strategy and a similarity measurement index use a traditional full search block matching and normalized cross correlation method (NCC) similarity criterion and sum-of-absolute-values-of-differences (SAD) method, but various other improved search strategies and similarity measurement indexes can also be used, such as a three step search method (TSS), and the self-correction method and device which are provided by the invention are not affected when different similarity search strategy methods are used. The search strategy in the invention searches matching blocks one by one, the precision can reach the pixel level, and by performing interpolation calculation on the pixel points of the speckle images, and the precision can also reach the sub-pixel level.

Although the foregoing embodiment is finished in a specific system, it should not be regarded as the limitation to the invention, the invention can be similarly applied to a similar pattern projection and image sensor system, the number of speckle feature blocks for detecting an offset is not limited to be 1, can be more than 1, and can be 2, 3, 4, . . . , n; and the sizes or shapes of the speckle feature blocks are variable, and the speckle feature blocks can be in geometrical shapes such as rectangle, diamond and roundness besides square. Therefore, modifications and improvements which are made within the spirit and scope of the invention shall be included in the foregoing claims.

Figure 8:
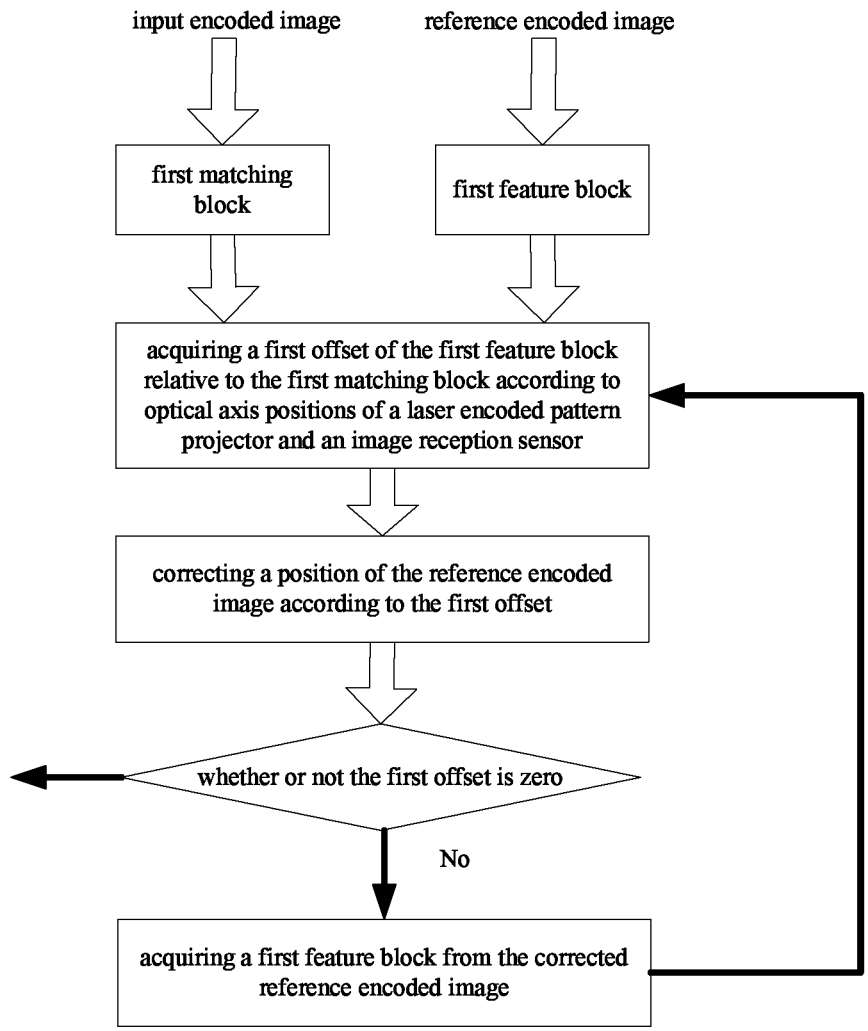
FIG. 8 is a schematic diagram of a self-correction method in an embodiment.

In one embodiment, the present disclosure provides an automatic correction method for a structured-light 3D depth camera. As shown in FIG. 8, the method comprises the following steps:

S100, acquiring a first feature block from a reference encoded image, wherein the depth distance of the reference encoded image is known;

S200, searching for a first matching block corresponding to the first feature block from an input encoded image;

S300, acquiring a first offset of the first feature block relative to the first matching block according to optical axis positions of a laser encoded pattern projector and an image reception sensor;

S400, correcting a position of the reference encoded image according to the first offset; and S500, acquiring a first feature block from the corrected reference encoded image if the first offset is not zero, and returning to S200.

In this embodiment, the optimal encoded matching block corresponding to the encoded feature block is searched for in the input encoded image in the above steps through the similarity criterion, and then the offset of the feature block relative to the matching block is acquired; and the offset is detected, if the optical axis of the laser encoded pattern projector and the optical axis of the image reception sensor change, the offset of the feature block relative to the matching block will change accordingly, and then the position of the reference encoded image is oppositely adjusted upwards or downwards according to an offset change to form a self-feedback regulation closed-loop system between the center of the input encoded image and the center of the reference encoded image so that the optimal matching relation can always be figured out when the optical axis of the input encoded image and the optimal axis of the reference encoded image change drastically.

According to the method or device based on any one of the above or below implementation schemes/characteristics/aspects, the laser encoded pattern projector is used to project a structured-light encoded image and is formed by a vertical cavity surface emitting laser (VCSEL), a collimating lens and a diffractive optical element (DOE), or is formed by a laser diode (LD), a collimating lens and a DOE, or is formed by LD/VCSEL and a Micro Electro Mechanical System (MEMS) or adopts digital light processing (DLP) for projection. Structured-light encoded patterns projected by the laser encoded pattern projector include random speckles, regular symbol array structured light, and hybrid structured light codes of the random speckles and the regular symbol array structured light.

The input encoded image is an encoded pattern formed by projecting a laser beam to a target object or to a projection space with the laser encoded pattern projector and is then transmitted, and finally, is collected by the image reception sensor to acquire an encoded image sequence. The speckle pattern is adaptively preprocessed like the reference encoded image, and after being preprocessed, the speckle pattern is stored in rows according to a field synchronization signal and a row synchronization signal. The present disclosure is suitable for various structured-light encoded patterns such as random speckles, regular symbol array structured light, and hybrid structured-light codes of the random speckles and the regular symbol array structured light.

The reference encoded image is cured in an internal or external memory, has known depth distance information and is stored in rows after being preprocessed like the input encoded image, and the row data position in which the reference encoded image is read is the same as that of the input encoded image.

Preprocessing carried out on the reference encoded image and the input encoded image includes RAW data format conversion, adaptive noise cancellation, coherence-enhancing, binarization and the like. By preprocessing the laser encoded image, the encoded pattern is clearer, noise interference is reduced, and automatic correction and depth perception calculation described above are facilitated.

The reference encoded image is a matching reference pattern which is obtained by projecting a laser beam in a constant pattern with the laser projector to a plane with a distance d away from the laser projector and perpendicular to the central axis of the projector, is acquired by the image reception sensor and is stored to be used for depth perception calculation of the input encoded image sequence after being adaptively preprocessed. The reference encoded image can be a laser speckle encoded pattern formed by random speckles, a symbol array encoded pattern formed by regular symbols or a hybrid encoded pattern formed by random speckles and regular symbols.

The method based on any one of the above or below implementation schemes/characteristics/aspects further comprises the following steps:

S600, acquiring one pixel of the input encoded image, and taking the pixel as a first pixel; acquiring a second feature block with the first pixel as a center;

S700, searching for a second matching block matched with the second feature block from the corrected reference encoded image;

S800, acquiring a second offset of the second feature block relative to the second matching block, and calculating a depth distance corresponding to the first pixel according to the second offset; and S900, returning to S600 till depth distances corresponding to all pixels of the input encoded image are acquired.

In this embodiment, an input image block is extracted from the input encoded image, a point corresponding to the center point of the input image block is found out in the adjusted reference encoded image, a matching search window within a certain range is extracted with the point as the center, and a candidate matching block with the maximum similarity is taken as the optimal matching block; the position offset of the center point of the optimal matching block relative to the center point of the matching search window is obtained, and this offset is the second offset of the input image block; and the depth information of the current center point of the input image block is calculated according to a depth calculation formula based on the known distance parameter of the reference encoded image and the baseline distance between the laser encoded pattern projector and the image reception sensor, and a depth map corresponding to the input whole speckle image is obtained through point-by-point and row-by-row calculation.

In this embodiment, when the optical axes change drastically, depth calculation is carried out in terms of the corrected offset after the optimal matching relation between the input encoded image and the reference encoded image is figured out, and in this way, the problems of depth precision reduction and mismatch noise increase caused by deflection of the optical axis of the laser pattern projector or the image sensor when falling, collision or the like occurs in the using process are solved.

According to the method or device based on any one of the above or below implementation schemes/characteristics/aspects, the depth calculation formula is preferably as follows:

$$d' = \frac{fsd}{fs + \Delta m \mu d}$$

In the formula, d is the known distance of the reference encoded image, f is the focal length of the image sensor, s is the baseline distance between the laser projector and the image reception sensor, $\mu$ is the pixel pitch parameter of the image sensor, d' is the depth information of the center point (x, y) of the input image block, $\Delta m$ is the difference between coordinates of the center point of the input image block and the center point x' of the optimal matching block, wherein $\Delta m = \Delta x'$, or $\Delta m = \Delta y'$.

According to the method based on any one of the above and below implementation schemes/characteristics/aspects, searching in S200 and S700 comprises the following steps: determining a center and size of a matching search window, wherein the center of the matching search window is a center point of the feature block, and the size of the matching search window is greater than the size of the feature block; and extracting candidate matching blocks from the matching search window, calculating similarities of the candidate matching blocks to the feature block, and taking the candidate matching block with the maximum similarity as the matching block corresponding to the feature block.

According to the method or device based on any one of the above or below implementation schemes/characteristics/aspects, for each feature block, the maximum similarity is figured out of all the similarities obtained through matching calculation, a matching block corresponding to the maximum similarity is taken as the optimal marching block of the feature block, the coordinate (x', y') of the center point of the optima matching block in the input encoded image is output, an offset ($\Delta x$, $\Delta y$) calculated according to (x, y) and (x', y') is the offset vector of the feature block, and the offset is calculated by subtracting the coordinate (x', y') of the center point of the optimal matching block from the coordinate (x, y) of the center point of the feature block in terms of X axis and Y axis.

As for multiple feature blocks, the offset of the center point $(x_{i=1, \ldots, p}, y_{i=1, \ldots, p})$ of each feature block relative to the center point $(x'_{i=1, \ldots, p}, y'_{i=1, \ldots, p})$ of the corresponding matching block is calculated in terms of the following formula:

$$\Delta x_i = x_i - x'_i$$

$$\Delta y_i = y_i - y'_i$$

An average of $(\Delta x_{i=1,\ldots,p}, \Delta y_{i=1,\ldots,p})$ is taken as the optimal offset $(\Delta x, \Delta y)$;

$$\Delta x = \frac{1}{p}\sum_{i=1}^{p}\Delta x_i,$$

$$\Delta y = \frac{1}{p}\sum_{i=1}^{p}\Delta y_i$$

According to the method based on any one of the above or below implementation schemes/characteristics/aspects, acquisition in S300 preferably comprises the following steps:

S301, acquiring center point coordinates of each feature block and the matching block corresponding to each feature block, and calculating differences between corresponding coordinate components of the center point coordinates;

S302, acquiring an average of the differences between all the coordinate components and taking the average as the first offset.

According to the method based on any one of the above or below implementation schemes/characteristics/aspects, correction in S300 comprises the following steps:

S311, if the optical axes of the laser encoded pattern projector and the image reception sensor are parallel to a first component of the first offset, moving in a direction opposite to a second component of the first offset by a distance equal to the absolute value of the second component of the first offset;

S312, if the optical axes of the laser encoded pattern projector and the image reception sensor are parallel to the second component of the first offset, moving in a direction opposite to the first component of the first offset by a distance equal to the absolute value of the first component.

The components of the first offset herein are two-dimensional vectors and include an X-axis vector and a Y-axis vector in the rectangular coordinate system of the image.

In this embodiment, if the optical axes of a projector and a reception camera in a structured-light projection and reception device are parallel in the horizontal direction, only an offset $\Delta y$ of the encoded feature block relative to the optimal feature block in the Y-axis direction is considerable, the offset $-\Delta y$ of the reference encoded image is oppositely adjusted till the center of the optical axis of the input encoded image and the center of the optical axis of the corrected reference encoded image are kept parallel in the horizontal direction. Similarly, if the optical axes of the projector and the reception camera in the structured-light projection and reception device are parallel in the vertical direction, only the offset $\Delta x$ of the encoded feature block relative to the optimal matching block in the X-axis direction is considerable, and the offset $-\Delta x$ of the reference encoded image is oppositely adjusted till the center of the optical axis of the input encoded image and the center of the optical axis of the corrected reference encoded image are kept parallel in the vertical direction.

A reference encoded image position adjustment sub-module oppositely adjusts the reference encoded image according to the offset $\Delta y$, wherein if $\Delta y > 0$, the whole reference encoded image is adjusted upwards, and $Image_{ref} = Image_{ref} - \Delta y$; if $\Delta y < 0$, the whole reference encoded image is adjusted downwards, and $Image_{ref} = Image_{ref} + \Delta y$; and if $\Delta y = 0$, it indicates that the optical axis of the reference encoded image does not change relative to the optical axis of the input encoded image, and the reference encoded image does not need to be adjusted.

According to the method in one embodiment, an encoded image sequence (with depth information unknown) input through a laser encoded pattern projector and an image reception sensor after being adaptively preprocessed is compared with a reference encoded image (serving as a standard encoded image of the matching criterion and having a constant pattern and known depth distance information) which is cured in a memory, an encoded feature block is extracted from the reference encoded image, matching movement between the encoded feature block and matching blocks, having the same size as the encoded feature block, input to the matching search window is estimated, and the optimal matching block most similar to the feature block is found out based on a certain search strategy and similarity criterion; an offset of the coordinate of the matching block in the input encoded image relative to the coordinate of the center point of the feature block is acquired, and the reference encoded image is oppositely adjusted according to the offset; block matching movement between the adjusted reference encoded image and the input encoded image is estimated to obtain an offset of each point in the input encoded image relative to the reference encoded image, then the depth information of the current center point is calculated according to a depth calculation formula based on the offset, the known distance parameter of the reference encoded image and the baseline distance between the laser encoded pattern projector and the image reception sensor, and finally, the depth information corresponding to the input whole encoded image is obtained through point-by-point and row-by-row calculation.

In one embodiment, the present disclosure provides an automatic correction device for a structured-light 3D depth camera. The device comprises:

a first acquisition module configured to acquire a first feature block from a reference encoded image, wherein the reference encoded image has a known depth distance;

a first search module configured to search for a first matching block corresponding to the first feature block from an input encoded image;

a first offset acquisition module configured to acquire a first offset of the first feature block relative to the first matching block according to optical axis positions of a laser encoded pattern projector and an image reception sensor;

a correction module configured to correct a position of the reference encoded image according to the first offset; and a first return module configured to acquire a first feature block from the corrected reference encoded image if the first offset is not zero and to return to the first search module.

In this embodiment, an image block having a size of m×n is extracted by the first acquisition module from a point (x, y) in the reference encoded image to be taken as the feature block. The first search module extracts an input encoded image block within a certain range with a corresponding point, identical with the center point (x, y) of the feature block, of the input encoded image as the center point, wherein the input encoded image block has a size of M×N, M and N are integers, generally M>m, and N>n.

The device based on any one of the above or below implementation schemes/characteristics/aspects further comprises:

a second acquisition module configured to acquire one pixel of the input encoded image, to take the pixel as a first pixel and to acquire a second feature block with the first pixel as a center;

a second search module configured to search for a second matching block matched with the second feature block from the corrected reference encoded image;
a calculation module configured to acquire a second offset of the second feature block relative to the second matching block and to calculate a depth distance corresponding to the first pixel according to the second offset; and
a second return module configured to return to the second acquisition module till depth distances corresponding to all pixels in the input encoded image are acquired.

According to the device based on any one of the above or below implementation schemes/characteristics/aspects, the first search module and the second search module preferably carry out searching through the following steps:
determining a center and size of a matching search window, wherein the center of the matching search window is a center point of the feature block, and the size of the matching search window is greater than the size of the feature block; and extracting candidate matching blocks from the matching search window, calculating similarities of the candidate matching blocks to the feature block, and taking the candidate matching block with the maximum similarity as the matching block corresponding to the feature block.

According to the device based on any one of the above or below implementation schemes/characteristics/aspects, the first offset acquisition module preferably acquires the first offset through the following steps:
acquiring center point coordinates of each feature block and the matching block corresponding to each feature block, and calculating differences between corresponding coordinate components of the center point coordinates; and
acquiring an average of the differences between all the coordinate components and taking the average as the first offset.

In the above embodiment, the first offset acquisition module preferably carries out correction through the following steps:
if the optical axes of the laser encoded pattern projector and the image reception sensor are parallel to a first component of the first offset, moving in a direction opposite to a second component of the first offset by a distance equal to the absolute value of the second component of the first offset;
if the optical axes of the laser encoded pattern projector and the image reception sensor are parallel to the second component of the first offset, moving in a direction opposite to the first component of the first offset by a distance equal to the absolute value of the first component;
wherein, the components of the first offset are two-dimensional vectors.

According to the device or method based on any one of the above or below implementation schemes/characteristics/aspects, the similarities are calculated through any one of the following methods:
Method 1: sum of absolute differences (SAD);
Method 2: normalization cross correlation (NCC) similarity criterion;
Method 3: three-step search (TSS).

The automatic correction method and device provided by the present disclosure will not be affected no matter which similarity search strategy or method is adopted.

According to the device or method based on any one of the above or below implementation schemes/characteristics/aspects, in the search strategy the matching blocks are preferably searched for one by one so that the precision can reach the pixel level, and the precision can even reach the sub-pixel level through interpolating calculation of the pixels of the speckle image.

Preferably, in terms of calculation based on the NCC similarity criterion, if the feature block is marked as $A_{ref}$, the corresponding matching block is marked as $A_{rel}$ and the similarity is marked as sim, the following relation is met:

$$sim = \frac{(nc - ab)}{\sqrt{a(n-a)b(n-b)}}$$

Wherein, $n_0$ is the number of pixels of the matching block (or the number of pixels of the feature block, namely m×n);

$$a = \sum_{i=1}^{m} \sum_{j=1}^{n} x_{i,j}^2,$$

$$b = \sum_{i=1}^{m} \sum_{j=1}^{n} y_{i,j}^2,$$

$$c = \sum_{i=1}^{m} \sum_{j=1}^{n} x_{i,j} y_{i,j},$$

wherein, $x_{i,j}$ is the value of the pixels of the feature block, and $y_{i,j}$ is the value of the pixels of the matching block.

As shown in FIG. 4, a matching block $A_{rel}$ is extracted from each point in the matching search window, the similarity between $A_{rel}$ and $A_{ref}$ is calculated, the maximum similarity max $(sim_{M \times N})$ or max $(sim'_{M \times N})$ of all the similarities in the matching search window is figured out, and the matching block corresponding to the maximum similarity is the optimal matching block.

According to the device or method based on any one of the above or below implementation schemes/characteristics/aspects, the size of the image block extracted from the input encoded image can be identical with or different from the size of the feature block extracted from the reference encoded image and the size of the feature block extracted by an input encoded image matching search window generation sub-module in the automatic correction process.

The self-correction method and device for the structured light depth camera provided by the invention not only are suitable for the structured light depth camera in the mobile phone, but also are suitable for other monocular, binocular or multi-view structured light depth camera modules; and meanwhile, the contents and the device of the invention can be realized by an ASIC chip, and can be realized on IP core embedded SoC application or software on various SoC processors (CPU, GPU, DSP and AP), and therefore, modifications and improvements which are made within the spirit and scope of the invention shall be included in the foregoing claims.

What is claimed is:

1. An automatic correction method for a structured-light 3D depth camera comprising a laser encoded pattern projector and an image reception sensor, comprising the following steps to perform a first calibration and a second calibration when optical axes of laser encoded pattern projector and an image reception sensor change, and the first calibration comprising:
S100, acquiring a first feature block from a reference encoded image having a known depth distance;
S200, searching for a first matching block corresponding to the first feature block from an input encoded image;
S300, acquiring a first offset of the first feature block relative to the first matching block according to optical axis positions of a laser encoded pattern projector and an image reception sensor; wherein acquisition in the S300 comprises the following steps:

S301, acquiring center point coordinates of each feature block and a matching block corresponding to each feature block, and calculating differences between corresponding coordinate components of the center point coordinates; and S302, acquiring an average of the differences between all the coordinate components, and taking the average as the first offset; and wherein correction in the S300 comprises the following steps:

S311, if optical axes of the laser encoded pattern projector and the image reception sensor are parallel to a first component of the first offset, moving in a direction opposite to a second component of the first offset by a distance equal to the absolute value of the second component of the first offset; and S312, if the optical axes of the laser encoded pattern projector and the image reception sensor are parallel to the second component of the first offset, moving in a direction opposite to the first component of the first offset by a distance equal to the absolute value of the first component, wherein the components of the first offset are two-dimensional vectors S400, correcting a position of the reference encoded image according to the first offset, thus yielding an intermediate corrected reference encoded image; and S500, acquiring a first feature block from the intermediate corrected reference encoded image if the first offset is not zero, and returning to S200, thereby yielding a final corrected reference encoded image with the first offset being zero;

wherein the second calibration comprises:

S600, acquiring one pixel of the input encoded image, and taking the pixel as a first pixel; and acquiring the second feature block with the first pixel as a center;

S700, searching for a second matching block matched with the second feature block from the final corrected reference encoded image;

S800, acquiring a second offset of the second feature block relative to the second matching block, and calculating a depth distance corresponding to the first pixel according to the second offset; and S900, returning to S600 till depth distances corresponding to all pixels of the input encoded image are acquired.

2. The method according to claim 1, wherein searching in the S200 and the S700 comprises the following steps:

determining a center and size of a matching search window, wherein the center of the matching search window is a center point of the feature block, and the size of the matching search window is greater than the size of the feature block; and extracting candidate matching blocks from the matching search window, calculating similarities of the candidate matching blocks to the feature block, and taking the candidate matching block with the maximum similarity as the matching block corresponding to the feature block.

3. An automatic correction device for a structured-light 3D depth camera comprising a laser encoded pattern projector and an image reception sensor, comprising a processor to perform a first calibration and a second calibration when optical axes of laser encoded pattern projector and an image reception sensor change, and for the first calibration, the processor is configured to:

acquire a first feature block from a reference encoded image having a known depth distance;

search for a first matching block corresponding to the first feature block from an input encoded image;

acquire a first offset of the first feature block relative to the first matching block according to optical axis positions of a laser encoded pattern projector and an image reception sensor, wherein the processor acquires the first offset through the following steps:

acquiring center point coordinates of each feature block and the matching block corresponding to each feature block, and calculating differences between corresponding coordinate components of the center point coordinates; and acquiring an average of the differences between all the coordinate components, and taking the average as the first offset and wherein the processor carries out correction through the following steps:

if optical axes of the laser encoded pattern projector and the image reception sensor are parallel to a first component of the first offset, moving in a direction opposite to a second component of the first offset by a distance equal to the absolute value of the second component of the first offset;

if the optical axes of the laser encoded pattern projector and the image reception sensor are parallel to the second component of the first offset, moving in a direction opposite to the first component of the first offset by a distance equal to the absolute value of the first component;

wherein, the components of the first offset are two-dimensional vectors;

correct a position of the reference encoded image according to the first offset, thus yielding an intermediate corrected reference encoded image;

acquire a first feature block from the intermediate corrected reference encoded image if the first offset is not zero and to return to the search for the first matching block, thereby yielding a final corrected reference encoded image with the first offset being zero; and for the second calibration, the processor is further configured to:

acquire one pixel of the input encoded image, to take the pixel as a first pixel and to acquire a second feature block with the first pixel as a center;

search for a second matching block matched with the second feature block from the corrected reference encoded image;

acquire a second offset of the second feature block relative to the second matching block and to calculate a depth distance corresponding to the first pixel according to the second offset; and return to the acquire one pixel of the input encoded image till depth distances corresponding to all pixels of the input encoded image are acquired.

4. The device according to claim 3, wherein the processor carries out searching through the following steps:

determining a center and size of a matching search window, wherein the center of the matching search window is a center point of a feature block, and the size of the matching search window is greater than a size of the feature block; and extracting candidate matching blocks from the matching search window, calculating similarities of the candidate matching blocks to the feature block, and taking the candidate matching block with the maximum similarity as a matching block corresponding to the feature block.

5. The method according to claim 1, wherein acquisition in the S300 comprises the following steps:

S301, acquiring center point coordinates of each feature block and the matching block corresponding to each feature block, and calculating differences between corresponding coordinate components of the center point coordinates; and S302, acquiring an average of the differences between all the coordinate components, and taking the average as the first off set.

6. The device according to claim 3, wherein the processor acquires the first offset through the following steps:

acquiring center point coordinates of each feature block and the matching block corresponding to each feature block, and calculating differences between corresponding coordinate components of the center point coordinates; and acquiring an average of the differences between all the coordinate components, and taking the average as the first offset.

\* \* \* \* \*